(12) United States Patent
Sekiya et al.

(10) Patent No.: US 10,273,631 B2
(45) Date of Patent: Apr. 30, 2019

(54) METHOD OF SPRAYING CHEMICAL SOLUTION

(71) Applicant: MAINTECH CO., LTD., Tokyo (JP)

(72) Inventors: Hiroshi Sekiya, Tokyo (JP); Daisuke Kobayashi, Tokyo (JP); Tomohiko Nagatsuka, Tokyo (JP)

(73) Assignee: MAINTECH CO., LTD., Tokyo (JP)

( * ) Notice: Subject to any disclaimer, the term of this patent is extended or adjusted under 35 U.S.C. 154(b) by 77 days.

(21) Appl. No.: 15/128,850

(22) PCT Filed: Mar. 20, 2015

(86) PCT No.: PCT/JP2015/001597
§ 371 (c)(1),
(2) Date: Sep. 23, 2016

(87) PCT Pub. No.: WO2015/151450
PCT Pub. Date: Oct. 8, 2015

(65) Prior Publication Data
US 2017/0073895 A1 Mar. 16, 2017

(30) Foreign Application Priority Data

Mar. 31, 2014 (JP) .................................. 2014-073054

(51) Int. Cl.
*B08B 3/02* (2006.01)
*C09D 5/00* (2006.01)
(Continued)

(52) U.S. Cl.
CPC ................ *D21F 1/32* (2013.01); *B08B 3/022* (2013.01); *C09D 5/00* (2013.01); *D21F 1/30* (2013.01); *D21F 1/325* (2013.01); *D21F 7/12* (2013.01)

(58) Field of Classification Search
CPC ............. D21F 7/12; D21F 1/32; B08B 3/022
See application file for complete search history.

(56) References Cited

U.S. PATENT DOCUMENTS 5,288,550 A * 2/1994 Sakato ................... A23D 9/007
428/321.1
2006/0162889 A1 7/2006 Sekiya et al.

FOREIGN PATENT DOCUMENTS

EP 1596000 A1 11/2005
EP 2966220 A1 1/2016
(Continued)

OTHER PUBLICATIONS

Machine translation: JP2009144304; Kashiwagi et al. (Year: 2009).*
(Continued)

*Primary Examiner* — Mikhail Kornakov
*Assistant Examiner* — Natasha N Campbell
(74) *Attorney, Agent, or Firm* — Muncy, Geissler, Olds & Lowe, P.C.

(57) ABSTRACT

[TASK] Provided is a method of spraying a chemical solution, the method being capable of efficiently applying a chemical solution to a traveling canvas and sufficiently preventing the adhesion of paper powder and pitch to the canvas.
[MEANS OF SOLVING THE PROBLEM] The present invention provides a method of spraying a chemical solution Y, the method comprising spraying the chemical solution Y continuously on a canvas K used in a dry part D of a paper machine by a spraying apparatus 10 while making the canvas K travel, wherein the canvas K is guided to an inside roll IR and an outside roll OR, and wherein the spraying apparatus 10 is disposed upstream from the outside roll OR and between the inside roll IR and the outside roll OR, and the chemical solution Y is sprayed toward the outside roll OR along a travel direction Y2 of the canvas K.

3 Claims, 5 Drawing Sheets

(51) Int. Cl.
*D21F 1/30* (2006.01)
*D21F 1/32* (2006.01)
*D21F 7/12* (2006.01)

(56) References Cited

FOREIGN PATENT DOCUMENTS

| | | |
|---|---|---|
| JP | 2004-058031 A | 2/2004 |
| JP | 2004-218186 A | 8/2004 |
| JP | 2005-314814 A | 11/2005 |
| JP | 2009-144304 A | 7/2009 |
| JP | 2013-040432 A | 2/2013 |
| WO | 2007/145107 A1 | 12/2007 |
| WO | 2014/030195 A1 | 2/2014 |

OTHER PUBLICATIONS

English translation of International Search Report for PCT/JP2015/001597.
Supplemental European Search Report of the corresponding EP application No. 15772450 dated Oct. 10, 2017.

* cited by examiner

METHOD OF SPRAYING CHEMICAL SOLUTION

TECHNICAL FIELD

The present invention relates to a method of spraying a chemical solution, and more specifically to a method of spraying a chemical solution in which a chemical solution is sprayed on a canvas used in a dry part of a paper machine by a spraying apparatus while making the canvas travel.

BACKGROUND ART

A paper machine for manufacturing a paper includes a dry part for heat-drying a wet paper.

When a wet paper is fed to the dry part, the wet paper is pressed against the surface of a dryer roll by a canvas, thereby being dried. At this time, the canvas rotates so as to travel at the same speed as the wet paper travels.

In the dry part, there is a problem that paper powder and pitch easily adhere to the canvas. If paper powder or pitch adheres to the canvas, the paper powder or the pitch is transferred to a wet paper, thereby causing the soiling of the wet paper. Therefore, a method of applying an anti-soiling agent to the canvas of the dry part has been developed (for example, refer to Patent Literatures 1 to 3).

CITATION LIST

Patent Literature

PTL 1: Japanese Patent Application Laid-Open Publication No. 2004-58031
PTL 2: Japanese Patent Application Laid-Open Publication No. 2004-218186
PTL 3: Japanese Patent Application Laid-Open Publication No. 2005-314814

SUMMARY OF INVENTION

Technical Problem

However, even with the method for preventing soiling described in Patent Literatures 1 to 3, the adhesion of paper powder and pitch to the canvas cannot be sufficiently prevented. That is, the method for preventing soiling described in Patent Literatures 1 to 3 cannot achieve efficient application of an anti-soiling agent to the canvas.

In particular, since the canvas travels at the same speed as the wet paper travels, an anti-soiling agent cannot be efficiently applied simply by spraying the agent.

The present invention was accomplished in view of the above-mentioned background, and an object of the invention is to provide a method of spraying a chemical solution, the method being capable of efficiently applying a chemical solution to a traveling canvas and sufficiently preventing the adhesion of paper powder and pitch to the canvas.

Solution to Problems

The present inventors conducted extensive research to solve the above problems. As a result, the inventors found that the problems mentioned above can be solved unexpectedly by providing a configuration in which a canvas was guided to an inside roll and an outside roll, disposing a spraying apparatus at a specific position, and spraying a chemical solution toward the outside roll along the travel direction of the canvas, and the inventors thus accomplished the invention.

The present invention provides (1) a method of spraying a chemical solution, the method comprising spraying a chemical solution continuously on a canvas used in a dry part of a paper machine by a spraying apparatus while making the canvas travel, wherein the canvas is guided to an inside roll and an outside roll, and wherein the spraying apparatus is disposed upstream from the outside roll and between the inside roll and the outside roll, and the chemical solution is sprayed toward the outside roll along the travel direction of the canvas.

The present invention provides (2) the method of spraying a chemical solution according to the (1), wherein a soil removal apparatus is disposed upstream from the spraying apparatus for the canvas.

The present invention provides (3) the method of spraying a chemical solution according to the (1) or the (2), wherein the distance L (mm) between the point of contact of the canvas with a perpendicular from a nozzle tip of the spraying apparatus to the canvas and the point of contact of the outside roll with the canvas is from 80 mm to 5000 mm.

The present invention provides (4) the method of spraying a chemical solution according to any one of the (1) to the (3), wherein the angle formed by the spraying direction of the spraying apparatus and the travel direction of the canvas is from 10 degrees to 80 degrees.

The present invention provides (5) the method of spraying a chemical solution according to any one of the (1) to the (4), wherein the soil removal apparatus is a sliding type high pressure water cleaner.

The present invention provides (6) the method of spraying a chemical solution according to any one of the (1) to the (5), wherein the spraying apparatus is a scanning type nozzle apparatus that sprays a chemical solution on the canvas while reciprocating in a direction perpendicular to the travel direction of the canvas.

The present invention provides (7) the method of spraying a chemical solution according to the (6), wherein the moving distance H of the nozzle apparatus during one rotation of the canvas and the width W of a portion sprayed on the canvas by the nozzle apparatus satisfy the following relationship.

$$0.5 \leq H/W \leq 12$$

The present invention provides (8) the method of spraying a chemical solution according to the (7), wherein the width W of a portion sprayed by the nozzle apparatus is from 30 mm to 150 mm, and the moving distance H of the nozzle apparatus is from 15 mm to 1800 mm.

The present invention provides (9) a chemical solution that is used for the method of spraying a chemical solution according to any one of (1) to (8), and has a viscosity of not more than 500 cps.

Advantageous Effects of Invention

In the method of spraying a chemical solution according to the present invention, a configuration is provided in which a canvas is guided to an inside roll and an outside roll, a spraying apparatus is disposed at a specific position, and the chemical solution is continuously sprayed on the canvas toward the outside roll along the travel direction of the canvas, whereby the chemical solution can be efficiently applied to the traveling canvas, and the adhesion of paper powder and pitch to the canvas can be sufficiently prevented.

In particular, when the angle forming by the spraying direction of the spraying apparatus and the travel direction of the canvas is within the above-mentioned range, the chemical solution can be more efficiently applied to the canvas.

In the method of spraying a chemical solution according to the present invention, when the distance L (mm) between the point of contact of the canvas with a perpendicular from a nozzle tip of the spraying apparatus to the canvas and the point of contact of the outside roll with the canvas is from 80 mm to 5000 mm, a chemical solution to be sprayed from the spraying apparatus is sprayed on the canvas, and a part of the chemical solution can be made to adhere to the outside roll by being put on a flow of air generated by the travel of the canvas (hereinafter, referred to as "an associated flow".

Here, the canvas is wound on the outside roll so that a side of the canvas, the side being to contact a wet paper, comes into contact with the outside roll, and thus, when the outside roll guides the canvas, a chemical solution adhering to the outside roll can be transferred to the side of the canvas, the side being to contact the wet paper.

In the method of spraying a chemical solution according to the present invention, when a soil removal apparatus is disposed upstream from the spraying apparatus for the canvas, a chemical solution can be sprayed by the spraying apparatus after paper powder and pitch adhering to the canvas are removed. With this, the soiling preventive effect of the chemical solution is increased.

Here, when the soiling removal apparatus is a sliding type high pressure water cleaner, paper powder and pitch adhering to the canvas are removed in larger amounts, and accordingly the soiling preventive effect of the chemical solution is further increased.

In the method of spraying a chemical solution according to the present invention, when the spraying apparatus is a scanning type nozzle apparatus that sprays a chemical solution on the canvas while reciprocating in a direction perpendicular to the travel direction of the canvas, the amount of the chemical solution used can be reduced, and the chemical solution can be more uniformly applied to the entirety of the canvas.

In the method of spraying a chemical solution according to the present invention, the moving distance H of the nozzle apparatus during one rotation of the canvas and the width W of a portion sprayed on the canvas by the nozzle apparatus satisfy the relationship:

$$0.5 \leq H/W \leq 12$$

so that the chemical solution can be applied to the canvas without the formation of a gap between portions sprayed with the chemical solution, and a uniform film can be surely formed on the entirety of the canvas. As a result, the occurrence of partial film breakage can be also prevented.

Furthermore, when the width W of a portion sprayed by the nozzle apparatus is from 30 mm to 150 mm and the moving distance H of the nozzle apparatus is from 15 mm to 1800 mm, a chemical solution can be efficiently sprayed on the entirety of the canvas without causing unevenness of spraying.

The chemical solution according to the present invention can be uniformly applied without unevenness when the chemical solution has a viscosity of not more than 500 cps.

DESCRIPTION OF EMBODIMENTS

Figure 1:
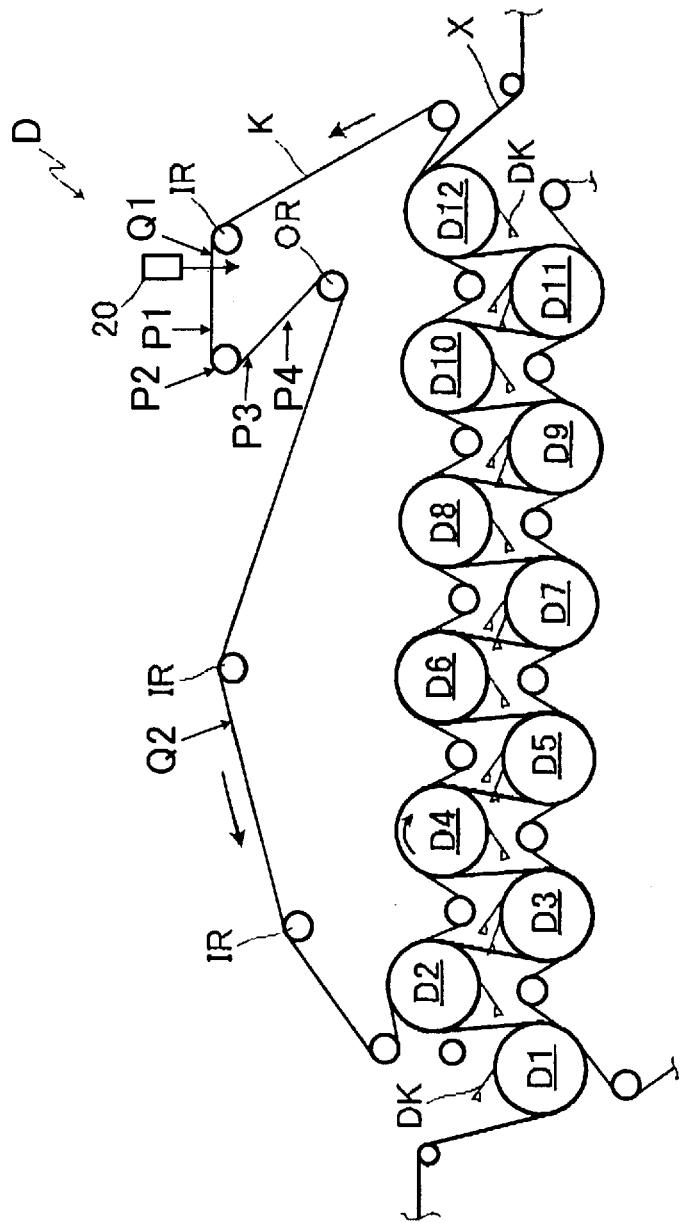
FIG. 1 is a schematic view illustrating a dry part of a paper machine to which a method of spraying a chemical solution according to the present embodiment is applied.

Hereinafter, a preferable embodiment of the present invention is described in detail with reference to the drawings as necessary. Note that, in the drawings, the same components are given the same reference numerals, and redundant descriptions are omitted. Furthermore, the vertical and horizontal positional relationships are based on the positional relationships illustrated in the drawings, unless otherwise noted. Furthermore, the dimensional ratios are not limited to the ratios illustrated in the drawings.

FIG. 1 is a schematic view illustrating a dry part of a paper machine to which a method of spraying a chemical solution according to the present embodiment is applied.

As illustrated in FIG. 1, a dry part D of a paper machine includes: a plurality of cylindrical dryer rolls (yankee dryer) that travels while heat-drying a wet paper X, namely, D1, D2, D3, D4, D5, D6, D7, D8, D9, D10, D11, and D12 (hereinafter, referred to as "D1 to D12"); doctors DK in contact with the respective dryer rolls D1 to D12; a canvas K that travels while pressing the wet paper X against the surfaces of the dryer rolls D1 to D12; an inside roll IR and an outside roll OR, each guiding the canvas K; a spraying apparatus 10 disposed upstream from the outside roll OR and between the inside roll IR and the outside roll OR and configured to continuously spray a chemical solution to the canvas K; and a soil removal apparatus 20 disposed upstream of the canvas K from the spraying apparatus 10. Note that the canvas K is configured to travel at the same speed as the wet paper X travels.

In the dry part D, the canvas K is guided by the inside roll IR and the outside roll OR.

At this time, the canvas K is guided not only by the inside roll IR, but also by the outside roll OR, and this offers an advantage that a machine structure for adjusting a canvas tension is simple and thereby provides easy of maintenance.

In the dry part D, the fed wet paper X is pressed against the surfaces of the rotating dryer rolls D1 to D12 by the canvas K. This allows the wet paper X to adhere to the dryer rolls D1 to D12, and at the same time to be heat-dried.

Note that, at this time, if paper powder or pitch adheres to the canvas K, the paper powder or the pitch is transferred from the canvas K and adheres to the wet paper X.

In the dry part D, the doctor DK is in contact with the dryer rolls D1 to D12. Thus, when the dryer rolls D1 to D12 rotate, the adhering paper powder and pitch are scraped off by the doctor DK.

The spraying apparatus 10 is disposed between the inside roll IR and the outside roll OR (refer to FIG. 1).

Figure 2A:
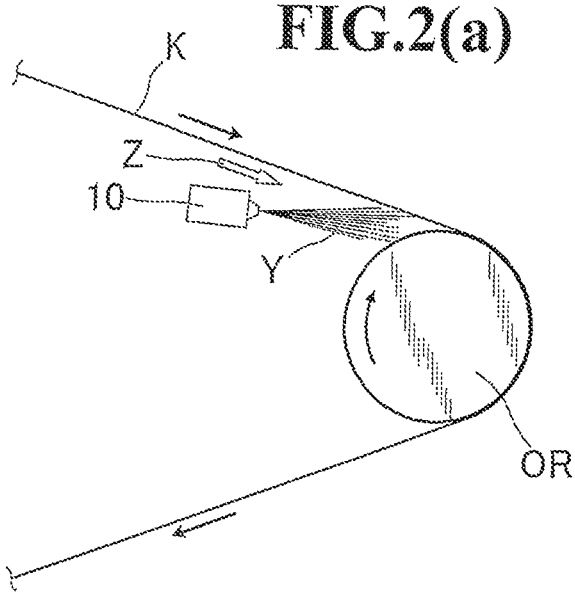
FIG. 2(a) is an enlarged schematic view illustrating a portion in which a spraying apparatus is installed in the dry part in the method of spraying a chemical solution according to the present embodiment.
Figure 2B:
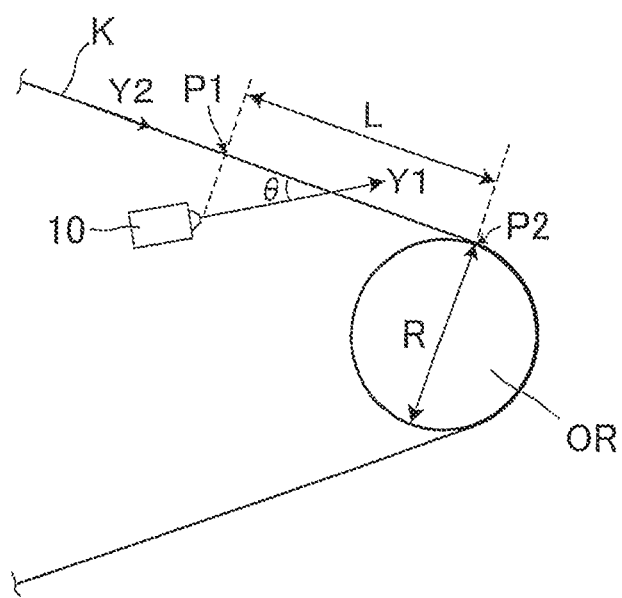
FIG. 2(b) is an illustration of the positional relationship of the spraying apparatus and the outside roll which are illustrated in FIG. 2(a).

FIG. 2(a) is an enlarged schematic view illustrating a portion in which the spraying apparatus is installed in the dry part in the method of spraying a chemical solution according to the present embodiment, and FIG. 2(b) is an illustration of the positional relationship of the spraying apparatus and the outside roll illustrated in FIG. 2(a).

As illustrated in FIG. 2(a), a chemical liquid Y is sprayed toward the outside roll along the travel direction of the canvas K. This allows the chemical solution to be prevented from colliding with an associated flow Z and being stirred up thereby.

As illustrated in FIG. 2(b), the distance L (mm) between a point of contact P1 of the canvas K with a perpendicular from a nozzle tip of the spraying apparatus 10 to the canvas K and a point of contact P2 of the outside roll OR with the canvas K is preferably in a range of 80 mm to 5000 mm, more preferably in a range of 200 mm to 3000 mm, still more preferably in a range of 200 mm to 1500 mm, and further still more preferably in a range of 200 mm to 1000 mm.

In this case, the chemical solution Y to be sprayed from the spraying apparatus 10 can be sprayed on the canvas K, and a part of the chemical solution Y can be made to adhere to the outside roll OR by being put on the associated flow Z generated by the travel of the canvas K. Then, since the canvas K is wound on the outside roll OR so that a side of the canvas K, the side beings to contact the wet paper X, comes into contact with the outside roll OR, when the outside roll OR guides the canvas K, the chemical solution Y adhering to the outside roll OR can be transferred to the side of the canvas K, the side being to contact the wet paper. With this, the chemical solution Y sprayed from the spraying apparatus 10 can be made to adhere to the canvas K more efficiently and more uniformly.

Note that, when the distance L is less than 80 mm, there is a higher risk, compared with the case where the distance L is within the above-mentioned range, that the chemical solution Y put on the associated flow Z collides with the outside roll OR, and then, bounces back and adheres to a nozzle 1 of the spraying apparatus 10, and the adhering chemical solution Y solidifies, thereby causing nozzle clogging, resulting in interruption of the spraying. Furthermore, even if the interruption of the spraying is not caused, there is a risk that a solidified substance of the chemical solution Y causes a change of the spraying direction, and the resultant unevenness of spraying. Furthermore, there is a risk that a solidified substance of the chemical solution Y adhering to the nozzle 1 drops on the canvas K, and is transferred to the wet paper, whereby the paper is spotted with white and soiled with grease.

Meanwhile, when the distance L exceeds 5000 mm, compared with the case where the distance L is within the above-mentioned range, sometimes, the chemical solution Y put on the associated flow Z does not sufficiently reach the outside roll OR.

As illustrated in FIG. 2(b), an angle θ formed by a spraying direction Y1 of the spraying apparatus 10 and a travel direction Y2 of the canvas is preferably in a range of 10 degrees to 80 degrees, more preferably in a range of 10 degrees to 60 degrees, and still more preferably in a range of 10 degrees to 45 degrees.

When the angle θ is within the above-mentioned range, the chemical solution Y can be efficiently applied to the canvas K.

Note that, when the angle θ formed by the spraying direction Y1 of the spraying apparatus 10 and the travel direction Y2 of the canvas is less than 10 degrees, the chemical solution Y is not sufficiently applied to the canvas K, compared with the case where the angle θ is within the above-mentioned range.

Meanwhile, when the angle θ formed by the spraying direction Y1 of the spraying apparatus 10 and the travel direction Y2 of the canvas is more than 80 degrees, compared with the case where the angle θ is within the above-mentioned range, there is a risk that the chemical solution Y is stirred up by the associated flow Z and adheres to the nozzle 1 of the spraying apparatus 10, and the adhering chemical solution Y solidifies, whereby the nozzle becomes clogged up, resulting in interruption of spraying. Furthermore, even if the interruption of the spraying is not caused, there is a risk that a solidified substance of the chemical solution Y causes a change of the spraying direction, and the resultant unevenness of spraying. Furthermore, there is a risk that a solidified substance of the chemical solution Y adhering to the nozzle 1 drops on the canvas K, and is transferred to the wet paper, whereby the paper might be spotted with white and soiled with grease.

In particular, when above-mentioned distance L is not less than 80 mm and less than 400 mm, the angle θ is preferably from 10 degrees to 30 degrees, meanwhile, when the distance L is not less than 400 mm and not more than 3000 mm, the angle θ is preferably from 30 degrees to 60 degrees.

Figure 3:
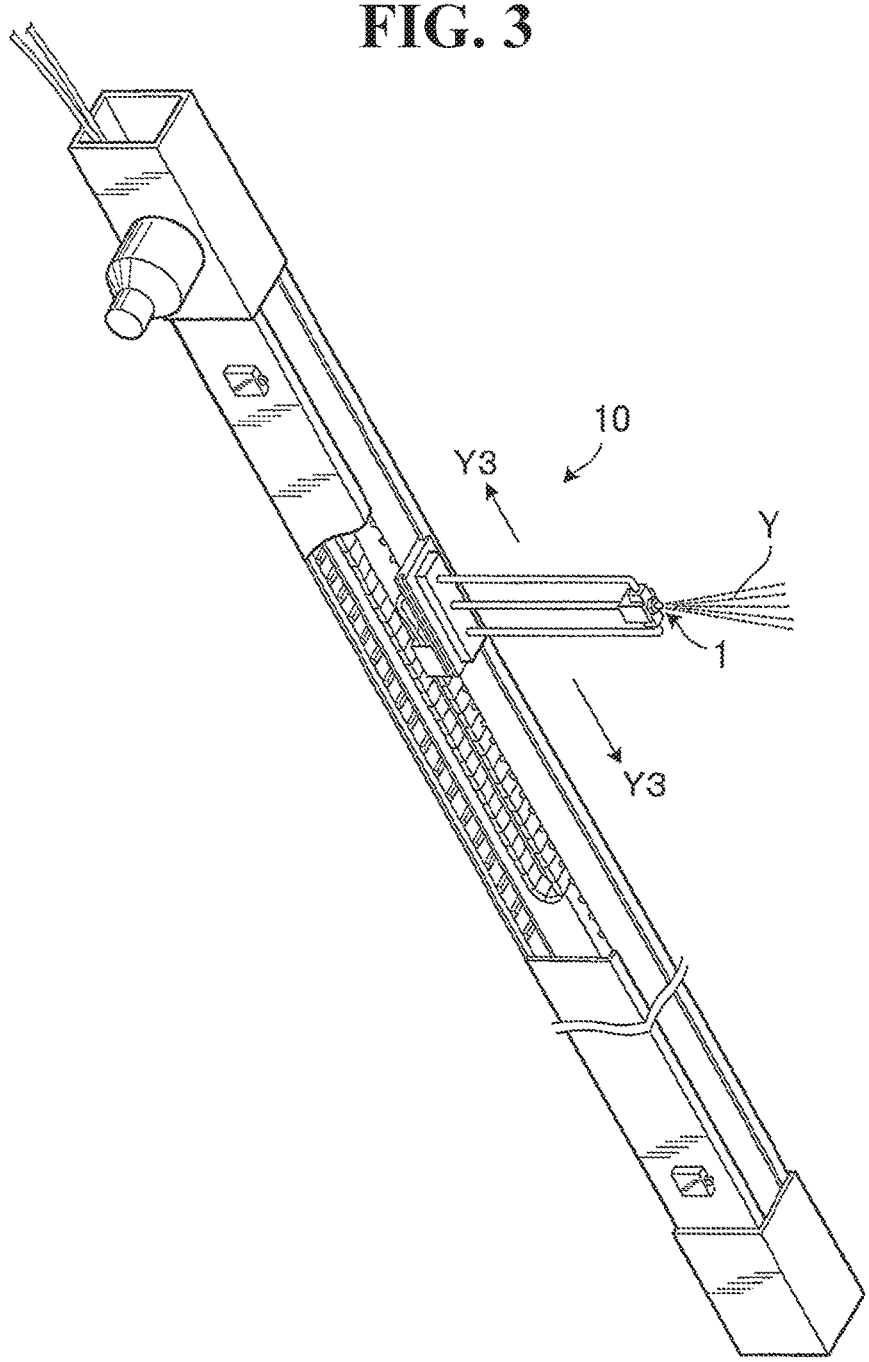
FIG. 3 is a schematic perspective view illustrating the spraying apparatus to which the method of spraying a chemical solution according to the present embodiment is applied.

FIG. 3 is a schematic perspective view illustrating the spraying apparatus to which the method of spraying a chemical solution according to the present embodiment is applied.

As illustrated in FIG. 3, the spraying apparatus 10 comprises a nozzle apparatus configured to inject the chemical solution Y from the nozzle 1.

Here, the nozzle apparatus preferably injects the chemical solution Y in a flat fan-shaped manner. With this, unevenness of spraying on the canvas K can be reduced, and the chemical solution Y can be applied to a wide area.

The spraying apparatus 10 is a scanning type spraying apparatus that sprays the chemical solution Y on the canvas K while reciprocating in a direction Y3 perpendicular to the travel direction Y2 of the canvas, not illustrated. Thus, the amount of the chemical solution Y used can be reduced, and the chemical solution Y can be more uniformly applied to the entirety of the canvas K.

See FIG. 1. The soil removal apparatus 20 is disposed upstream from the spraying apparatus 10 for the canvas K. Note that, as long as the soil removal apparatus 20 is disposed upstream from the spraying apparatus 10, the position of the soil removal apparatus 20 is not limited to a particular position. With this configuration, the chemical solution can be sprayed by the spraying apparatus 10 after paper powder and pitch adhering to the canvas K are removed, and thus the soiling preventive effect of the chemical solution Y can be increased.

Here, examples of the soil removal apparatus 20 include a sliding type high pressure water cleaner, a blade type cleaner that removes soils with the overall width, and a stainless steel wire net.

Among these, a sliding type high pressure water cleaner is preferable as the soil removal apparatus 20.

In particular, when a sliding type high pressure water cleaner is used with the hydraulic pressure being adjusted to 80 kg/cm$^2$ to 600 kg/cm$^2$, the soil removal effect can be further improved.

Furthermore, a sliding type high pressure water cleaner is more preferably used in combination with a blade type cleaner that removes soils with the overall width or a stainless steel wire net. In this case, the higher effect can be achieved.

Next, a method of spraying the chemical solution Y on the canvas K is described.

In the method of spraying a chemical solution according to the present embodiment, while the canvas K used in the dry part D of a paper machine is traveling, the chemical solution Y is sprayed on the canvas K by the spraying apparatus 10.

Figure 4:
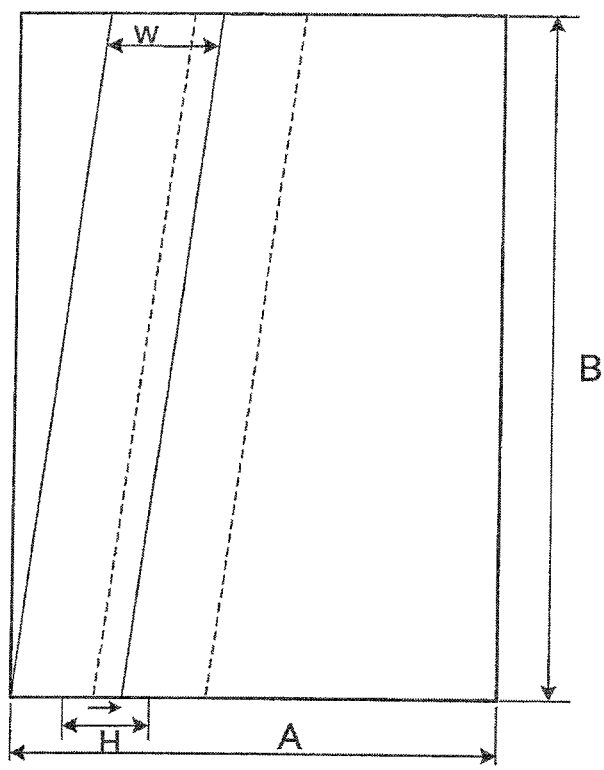
FIG. 4 is a developed view illustrating one rotation of the canvas for the purpose of describing a portion sprayed with a chemical solution when the chemical solution is sprayed on the canvas by the method of spraying a chemical solution according to the present embodiment.

FIG. 4 is a developed view illustrating one rotation of the canvas for the purpose of describing a portion sprayed with the chemical solution when the chemical solution is sprayed on the canvas by the method of spraying a chemical solution according to the present embodiment. One rotation of the canvas means that a specific point of the canvas returns to an original position after one cycle.

As mentioned above, during one rotation of the canvas, the nozzle apparatus sprays the chemical solution Y while moving in a direction perpendicular to the travel direction of the canvas K. Hence, it follows that the chemical solution Y is applied in the shape of a parallelogram as illustrated in FIG. 4.

At this time, the moving distance H of the nozzle apparatus during one rotation of the canvas K and the width W of a portion sprayed on the canvas by the spraying apparatus 10 (nozzle apparatus) satisfy the following relationship.

$0.5 \leq H/W \leq 20$

When the chemical solution is continuously sprayed, in a region satisfying $0.5 \leq H/W \leq 1$ the chemical solution Y can be applied to the canvas K without the formation of a gap between sprayed portions, and a uniform film can be surely formed on the entirety of the canvas K, meanwhile, in a region satisfying $1 < H/W \leq 20$ a gap, although formed, can be made small as much as possible. Here, in the canvas K, the outside roll OR that guides the canvas K makes the chemical solution uniform as the canvas K travels, and in addition to this, the chemical solution Y adhering to the outside roll OR is transferred to the canvas K, whereby the gap can be filled up. This allows a uniform film to be efficiently formed.

As a result, the occurrence of partial film breakage can be also prevented, and the adhesion of paper powder and pitch can be surely prevented.

Furthermore, in the above-mentioned range, the relationship of $1 \leq H/W \leq 12$ is preferably satisfied, the relationship of $1 \leq H/W \leq 9$ is more preferably satisfied, and the relationship of $1 \leq H/W \leq 7$ is still more preferably satisfied. With this, the chemical solution can be more efficiently applied, a more uniform film can be formed, and the occurrence of partial film breakage can be surely prevented.

The width W of a portion sprayed by the spraying apparatus 10 (nozzle apparatus) is preferably in a range of 30 mm to 150 mm.

When the width W of the sprayed portion is less than 30 mm, there is a disadvantage that the time elapsed before the nozzle goes and returns and sprays again is longer, compared with the case where the width W of the sprayed portion is within the above-mentioned range. Meanwhile, when the width W of the sprayed portion exceeds 150 mm, there is a disadvantage that the width ends of spray, which have less impact, are scattered, whereby adhesion efficiency to a target is reduced, compared with the case where the width W of the sprayed portion is within the above-mentioned range.

The moving distance H of the nozzle apparatus is preferably in a range of 15 mm to 1800 mm, and more preferably in a range of 15 mm to 1350 mm.

When the moving distance H is less than 15 mm, there is a disadvantage that the time elapsed before the nozzle goes and returns and sprays again is longer, compared with the case where the moving distance H is within the above-mentioned range. Meanwhile, when the moving distance H exceeds 1800 mm, there is a disadvantage that the width ends of spray, which have less impact, are scattered, whereby adhesion efficiency to a target is reduced, compared with the case where the moving distance H is within the above-mentioned range.

Here, the overall width A of the canvas K is preferably in a range of 3000 mm to 9000 mm. Note that the overall width A of the canvas K means the overall width of the canvas K in a direction perpendicular to the travel direction of the canvas K.

An overall width A of less than 3000 mm does not particularly cause a problem, but, there is a disadvantage that, compared with the case where the overall width A is within the above-mentioned range, the application amount to the canvas is slightly more excessive, whereby the adjustment of spraying amount is required. When the overall width A exceeds 9000 mm, there are disadvantages that, compared with the case where the overall width A is within the above-mentioned range, the time elapsed before the nozzle goes and returns and sprays again is longer, and film breakage more easily occurs.

The overall length B of the canvas K is preferably in a range of 25000 mm to 90000 mm. Note that the overall length B of the canvas K means the overall length of the canvas K in the travel direction of the canvas K.

When the overall length B is less than 25000 mm, there is a disadvantage that, compared with the case where the overall length B is within the above-mentioned range, the application amount to the canvas is slightly more excessive, whereby the adjustment of spraying amount is required. Meanwhile, when the overall length B exceeds 90000 mm, there are disadvantages that, compared with the case where the overall length B is within the above-mentioned range, the time elapsed before the nozzle goes and returns and sprays again is longer, and film breakage more easily occurs.

Furthermore, the time required for one rotation of the canvas K is preferably in a range of 1 second to 20 seconds.

When the time is less than 1 second, there is a disadvantage that, compared with the case where the time is within the above-mentioned range, moisture in the chemical does not volatilize, and accordingly, sufficient effects are not achieved. When the time exceeds 20 seconds, there is a disadvantage that, compared with the case where the time is within the above-mentioned range, the length of time that a wet paper is in contact with the dryer roll D1 is longer, and accordingly a film is absorbed and film breakage more easily occurs.

In the method of spraying a chemical solution according to the present embodiment, the chemical solution is preferably water-soluble and preferably forms a film when sprayed on the canvas K. In this case, the occurrence of partial film breakage can be surely prevented, and thus, the chemical solution can surely and sufficiently take effect.

At this time, the amount of the chemical solution sprayed is preferably in a range of 0.1 μg/m² to 400 μg/m² in terms of solid contents.

When the sprayed amount is less than 0.1 μg/m², compared with the case where the sprayed amount is within the above-mentioned range, the chemical solution does not sufficiently adhere to the surface of the canvas K. Meanwhile, when the sprayed amount exceeds 400 μg/m², compared with the case where the sprayed amount is within the above-mentioned range, there is a risk that a surplus is absorbed into the wet paper X.

Such chemical solution is not limited to a particular solution, but, examples of the chemical solution include an anti-soiling agent, a release agent, and a cleaning agent.

According to the method of spraying a chemical solution of the present embodiment, the chemical solution can be efficiently applied to a traveling canvas, and the adhesion of paper powder and pitch to the canvas can be sufficiently prevented.

The chemical solution according to the present embodiment is used for the above-mentioned method of spraying a chemical solution.

Examples of a main component of the chemical solution include a water-soluble polymer, a silicone emulsion, and wax.

The viscosity of the chemical solution is preferably in a range of not more than 500 cps at room temperature (25° C.), and more preferably in a range of 1 cps to 200 cps.

When the viscosity exceeds 500 cps, compared with the case where the viscosity is within the above-mentioned range, there is a risk that the scattered chemical solution adheres to an opening of a nozzle or a slit of a spraying nozzle.

Furthermore, the chemical solution is not sufficiently jetted out of a nozzle, or the spraying nozzle cannot sufficiently function, and therefore, the chemical solution cannot be sufficiently applied to a traveling body, and in addition, the scattering of the chemical solution tends to be easily caused.

The proportion of a residual component (a component to become a solidified substance) contained in the chemical solution is preferably not more than 50% by mass, and more preferably in a range of 0.1% by mass to 50% by mass.

In this case, it can be prevented that the scattered chemical solution adheres to a nozzle opening of a discharge nozzle or a slit of a spraying nozzle, and the nozzle opening or the slit is clogged up with the residual component contained in the chemical solution.

The preferred embodiment of the present invention has been described above, but the invention is not limited to the above-described embodiment.

For example, in the method of spraying a chemical solution according to the present embodiment, twelve dryer rolls D1 to D12 are installed in the dry part D, but, the number of the dryer rolls are not particularly limited.

In the method of spraying a chemical solution according to the present embodiment, the nozzle apparatus injects the chemical solution Y in a flat fan-shaped manner, but, the manner is not limited to this.

In the method of spraying a chemical solution according to the present embodiment, the chemical solution Y is sprayed by a single nozzle apparatus, but, may be sprayed by a plurality of nozzle apparatuses.

In the method of spraying a chemical solution according to the present embodiment, the spraying apparatus 10 is a scanning type nozzle apparatus, but, may be a fixed shower. In this case, the chemical solution Y is injected all at once to be sprayed on the canvas K.

EXAMPLES

Hereinafter, the present invention will be described in further detail based on Examples, but, the present invention is not limited to Examples.

Examples 1, 2, and Comparative Examples 1 to 3

Figure 5:
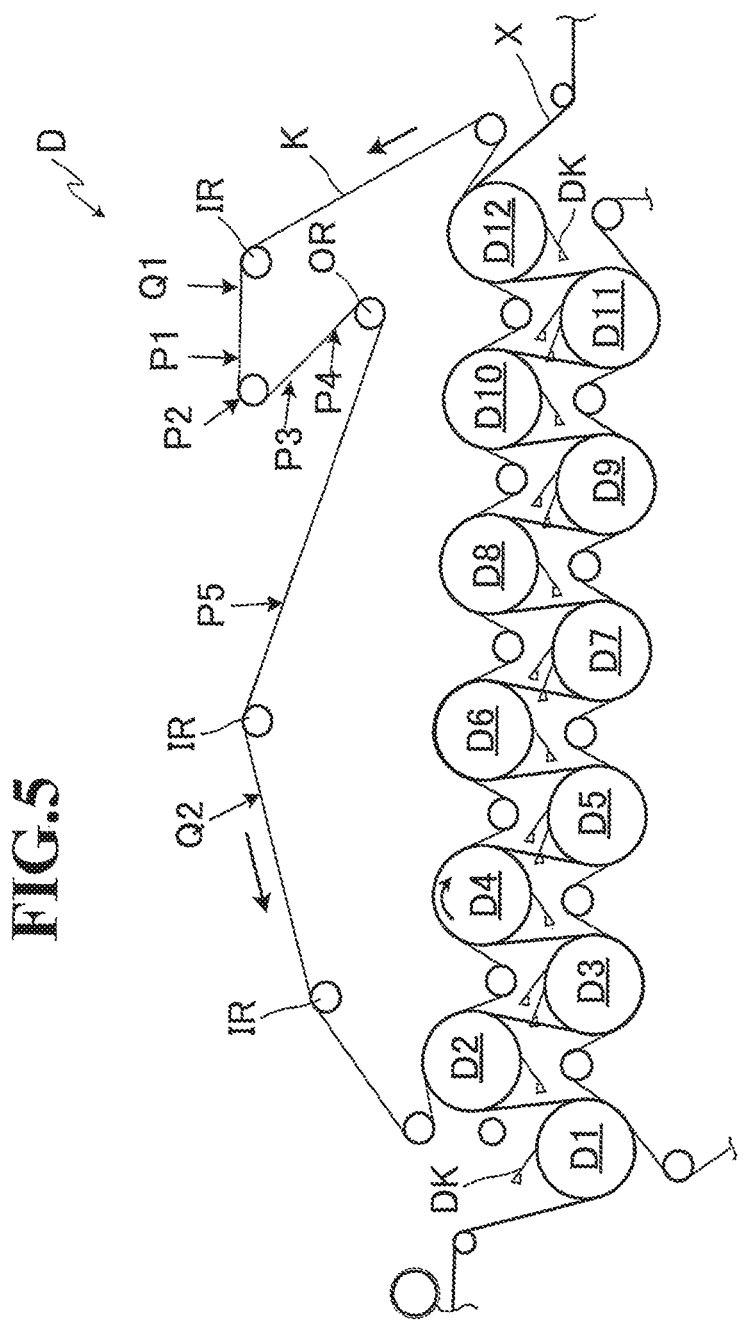
FIG. 5 is a schematic view illustrating the position of the nozzle apparatus in Examples.

A paper machine illustrated in FIG. 5 was operated in such a manner that a wet paper having a paper width of 5.75 m was moved at a paper-making rate of 850 m/min; the nozzle apparatuses 10 were disposed at spraying positions P1 to P5 illustrated in FIG. 5 for the canvas K (canvas length: 35 m); and an anti-soiling agent (Clean keeper PBS6015, 10% concentration, 2 cps viscosity (25° C.)) was sprayed at 7 cc/min. Note that a sliding type high pressure water cleaner was disposed at a position Q1 upstream from the nozzle apparatuses 10. Furthermore, the water pressure of the sliding type high pressure water cleaner was 250 kg/cm². Furthermore, the angle θ forming by the spraying direction of the nozzle apparatus 10 and the travel direction of the canvas K was 45° (refer to FIG. 2(b)).

[Evaluation Method]

Comparative evaluations were performed on Examples 1 and 2 and Comparative Examples 1 to 3 in such a manner that soils on the surfaces of the canvas K and the outside roll OR (400 mm in diameter) were photographed at fixed points after a lapse of 10 days, and the percentage of pitch was calculated by means of image analysis.

Table 1 shows the results thus obtained.

TABLE 1

| Example | Installation position | Soiling percentage of canvas | Soiling percentage of outside roll |
|---|---|---|---|
| Example 1 | P3 | 2% | 0% |
| Example 2 | P4 | 1% | 0% |
| Comparative Example 1 | P1 | 60% | 73% |
| Comparative Example 2 | P2 | 65% | 70% |
| Comparative Example 3 | P3 | 72% | 80% |

The results shown in Table 1 revealed that, when the nozzle apparatuses 10 were disposed upstream from the outside roll OR and between the inside roll IR and the outside roll OR, the canvas and the outside roll were considerably less soiled.

Examples 3 to 8

The paper machine illustrated in FIG. 5 was operated in such a manner that a wet paper having a paper width of 4.75 m was moved at a paper-making rate of 680 m/min; the nozzle apparatus 10 was disposed at the spraying position P4 illustrated in FIG. 5 for the canvas K (canvas length: 35 m); and an anti-soiling agent (Clean keeper PBS8184, 10% concentration, 1 cps viscosity (25° C.)) was sprayed at 7 cc/min. At this time, a sliding type high pressure water cleaner was disposed at the position Q1 upstream from the nozzle apparatus 10 or at a position Q2 downstream from the nozzle apparatus 10, as illustrated in Table 2. Similarly, evaluations were performed using a blade type cleaner or a stainless steel wire net in place of the sliding type high pressure water cleaner, as illustrated in Table 2. Note that the water pressure of the sliding type high pressure water cleaner was 290 kg/cm$^2$.

[Evaluation Method]

Comparative evaluations were performed on Examples 1, 3 to 8 in such a manner that soils on the surfaces of the canvas K and the outside roll OR (400 mm in diameter) were photographed at fixed points after a lapse of 10 days, and the percentage of pitch was calculated by means of image analysis.

Table 2 shows the results thus obtained.

TABLE 2

| | Soil removal apparatus | Installation position | Soiling percentage of canvas | Soiling percentage of outside roll |
|---|---|---|---|---|
| Example 1 | Sliding type high pressure water cleaner | Q1 | 2% | 0% |
| Example 3 | Sliding type high pressure water cleaner | Q2 | 5% | 10% |
| Example 4 | Stainless steel wire net | Q1 | 20% | 5% |
| Example 5 | Stainless steel wire net | Q2 | 45% | 25% |
| Example 6 | Blade type cleaner | Q1 | 13% | 3% |
| Example 7 | Blade type cleaner | Q2 | 11% | 18% |
| Example 8 | None | — | 55% | 65% |

The results shown in Table 2 revealed that, when the sliding type high pressure water cleaner serving as a soil removal apparatus was installed upstream from the nozzle apparatus and used, the soiling percentage of the canvas and the soiling percentage of the outside roll were considerably lower.

Furthermore, although not shown, when the sliding type high pressure water cleaner was used in combination with the blade type cleaner or the stainless steel wire net, the soiling percentage of the canvas and the soiling percentage of the outside roll were lower.

Examples 9 to 30

The paper machine illustrated in FIG. 5 was operated in such a manner that a wet paper having a paper width of 4.7 m was moved at a paper-making rate of 790 m/min; the nozzle apparatus 10 was disposed at the spraying position P4 illustrated in FIG. 5 for the canvas K (canvas length: 35 m); the distance L (refer to FIG. 2(b)) between the point of contact of the canvas K with a perpendicular from the nozzle tip of the nozzle apparatus 10 to the canvas K and the point of contact of the outside roll OR with the canvas K was set to values shown in Table 3; and an anti-soiling agent (Clean keeper PBS2154, 10% concentration, 2 cps viscosity (25° C.)) was sprayed at 7 cc/min. Note that the sliding type high pressure water cleaner was disposed at the position Q1 upstream from the nozzle apparatus 10. The water pressure of the sliding type high pressure water cleaner was 290 kg/cm$^2$. Furthermore, the angle θ forming by the spraying direction of the nozzle apparatus 10 and the travel direction of the canvas K was 45° (refer to FIG. 2(b)).

[Evaluation Method]

Comparative evaluations were performed on Examples 9 to 30 in such a manner that soils on the surfaces of the canvas K and the outside roll OR (350 mm in diameter) were photographed at fixed points after a lapse of 10 days, and the pitch percentage was calculated by means of image analysis.

Furthermore, the clogging percentage of the nozzle after the lapse of 10 days was calculated by means of photography and image analysis.

Furthermore, the wet paper was examined for a defect that was caused by the dropping, on the canvas K, of a solidified substance of the chemical solution Y adhering to the nozzle 1.

Table 3 shows the results thus obtained.

TABLE 3

| | Distance L (mm) | Soiling percentage of canvas | Soiling percentage of outside roll | Nozzle clogging percentage | Defect of wet paper |
|---|---|---|---|---|---|
| Example 9 | 40 | 15% | 0% | 80% | Defect occurrence after a lapse of 6 days |
| Example 10 | 60 | 11% | 0% | 60% | Defect occurrence after a lapse of 7 days |
| Example 11 | 80 | 6% | 0% | 19% | None |
| Example 12 | 100 | 5% | 0% | 17% | None |
| Example 13 | 150 | 4% | 0% | 15% | None |
| Example 14 | 200 | 0% | 0% | 0% | None |
| Example 15 | 250 | 0% | 0% | 0% | None |
| Example 16 | 300 | 0% | 0% | 0% | None |
| Example 17 | 350 | 0% | 0% | 0% | None |
| Example 18 | 400 | 0% | 0% | 0% | None |
| Example 19 | 500 | 0% | 0% | 0% | None |
| Example 20 | 700 | 0% | 0% | 0% | None |
| Example 21 | 900 | 0% | 0% | 0% | None |
| Example 22 | 1000 | 0% | 0% | 0% | None |
| Example 23 | 1500 | 1% | 1% | 0% | None |
| Example 24 | 2000 | 2% | 2% | 0% | None |
| Example 25 | 3000 | 2% | 2% | 0% | None |
| Example 26 | 4000 | 7% | 7% | 0% | None |
| Example 27 | 4500 | 7% | 10% | 0% | None |
| Example 28 | 5000 | 7% | 15% | 0% | None |
| Example 29 | 6000 | 8% | 30% | 0% | None |
| Example 30 | 6500 | 8% | 46% | 0% | None |

The results shown in Table 3 revealed that, when the distance L between the point of contact of the canvas K with a perpendicular from the nozzle tip of the nozzle apparatus 10 to the canvas K and the point of contact of the outside roll OR with the canvas K was set to not less than 80 mm, the soiling percentage of the canvas was considerably lower and the amount of the solidified substance adhering to the nozzle tip was considerably smaller.

Furthermore, it was revealed that, when the distance L between the point of contact of the canvas K with a perpendicular from the nozzle tip of the nozzle apparatus 10 to the canvas K and the point of contact of the outside roll OR with the canvas K was set to not less than 200 mm, the soiling percentage of the canvas was still lower and the solidified substance did not adhere to the nozzle tip.

Furthermore, it was revealed that, when the distance L was not more than 5000 mm, the soiling percentage of the outside roll was considerably lower.

Examples 31 to 39

The paper machine illustrated in FIG. 5 was operated in such a manner that a wet paper having a paper width of 4.75 m was moved at a paper-making rate of 680 m/min; the nozzle apparatus 10 was disposed at the spraying position P4 illustrated in FIG. 5 for the canvas K (canvas length: 35 m); and the distance L (refer to FIG. 2(b)) between the point of contact of the canvas K with a perpendicular from the nozzle tip of the nozzle apparatus 10 to the canvas K and the point of contact of the outside roll OR with the canvas K was set to 400 mm. Furthermore, the angle θ (refer to FIG. 2(b)) forming by the spraying direction of the nozzle apparatus 10 and the travel direction of the canvas K was set to values shown in Table 4, and an anti-soiling agent (Clean keeper PBS8184, 10% concentration, 1 cps viscosity (25° C.)) was sprayed at 7 cc/min. Note that the sliding type high pressure water cleaner was disposed at the position Q1 upstream from the nozzle apparatus 10. The water pressure of the sliding type high pressure water cleaner was 290 kg/cm$^2$.

[Evaluation Method]

Comparative evaluations were performed on Examples 31 to 39 in such a manner that soils on the surfaces of the canvas K and the outside roll OR (380 mm in diameter) were photographed at fixed points after a lapse of 20 days, and the percentage of pitch was calculated by means of image analysis.

Furthermore, the clogging percentage of the nozzle after the lapse of 20 days was calculated by means of photography and image analysis.

Furthermore, the wet paper was examined for a defect that was caused by the dropping, on the canvas K, of a solidified substance of the chemical solution Y adhering to the nozzle 1.

Table 4 shows the results thus obtained.

TABLE 4

| | Angle θ | Soiling percentage of canvas | Soiling percentage of outside roll | Nozzle clogging percentage | Defect of wet paper |
|---|---|---|---|---|---|
| Example 31 | 5 | 52% | 0% | 0% | None |
| Example 32 | 8 | 38% | 0% | 0% | None |
| Example 33 | 10 | 4% | 0% | 0% | None |
| Example 34 | 30 | 1% | 0% | 0% | None |
| Example 35 | 45 | 0% | 0% | 0% | None |
| Example 36 | 60 | 2% | 3% | 3% | None |
| Example 37 | 80 | 4% | 7% | 5% | None |
| Example 38 | 90 | 10% | 18% | 50% | Defect occurrence after a lapse of 14 days |
| Example 39 | 100 | 15% | 24% | 55% | Defect occurrence after a lapse of 14 days |

The results shown in Table 4 revealed that, when the angle θ forming by the spraying direction of the nozzle apparatus 10 and the travel direction of the canvas K was not less than 10 degrees, the soiling percentage of the canvas was considerably lower.

Furthermore, it was revealed that, when the angle θ was not more than 80 degrees, the soiling percentage of the outside roll was considerably lower and the amount of the solidified substance adhering to the nozzle tip was considerably smaller.

Examples 40 to 53

The paper machine illustrated in FIG. 5 was operated in such a manner that a wet paper having a paper width of 5.0 m was moved at a paper-making rate of 680 m/min; the nozzle apparatus 10 was disposed at the spraying position P4 illustrated in FIG. 5 for the canvas K (canvas length: 40 m); and an anti-soiling agent (Clean keeper PBS3184, 10% concentration, 2 cps viscosity (25° C.)) was sprayed at 5 cc/min. Note that the sliding type high pressure water cleaner was disposed at the position Q1 upstream from the nozzle apparatus 10. The water pressure of the sliding type high pressure water cleaner was 290 kg/cm$^2$.

Furthermore, the moving distance H of the nozzle apparatus 10 during one rotation of the canvas K and the width W of a portion sprayed on the canvas K by the nozzle apparatus 10 were set to values shown in Table 5.

Table 5 shows the results thus obtained.

[Evaluation Method]

Comparative evaluations were performed on Examples 40 to 53 in such a manner that soils on the surface of the canvas K was photographed at a fixed point after a lapse of 5 days, and the percentage of pitch was calculated by means of image analysis.

TABLE 5

| | Moving distance H (mm) | Sprayed portion width W (mm) | H/W | Soiling percentage of canvas |
|---|---|---|---|---|
| Example 40 | 60 | 150 | 0.4 | 45% |
| Example 41 | 75 | 150 | 0.5 | 12% |
| Example 42 | 90 | 150 | 0.6 | 10% |
| Example 43 | 120 | 150 | 0.8 | 7% |
| Example 44 | 150 | 150 | 1.0 | 0% |
| Example 45 | 300 | 150 | 2.0 | 1% |
| Example 46 | 450 | 150 | 3.0 | 1% |
| Example 47 | 750 | 150 | 5.0 | 1% |
| Example 48 | 1050 | 150 | 7.0 | 1% |
| Example 49 | 1350 | 150 | 9.0 | 2% |
| Example 50 | 1650 | 150 | 11.0 | 5% |
| Example 51 | 1800 | 150 | 12.0 | 8% |
| Example 52 | 1950 | 150 | 13.0 | 15% |
| Example 53 | 2100 | 150 | 14.0 | 19% |

The results shown in Table 5 revealed that, when RHW was in a range of 0.5 to 12, the canvas was less soiled, and furthermore, when H/W was in a range of 1.0 to 9.0, the canvas was still less soiled.

Examples 54 to 98

The paper machine illustrated in FIG. 5 was operated in such a manner that a wet paper having a paper width of 5.75 m was moved at a paper-making rate of 850 m/min; the nozzle apparatus 10 was disposed at the spraying position P4 illustrated in FIG. 5 for the canvas K (canvas length: 35 m); and the distance L (refer to FIG. 2(b)) between the point of contact of the canvas K with a perpendicular from the nozzle tip of the nozzle apparatus 10 to the canvas K and the point of contact of the outside roll OR with the canvas K was set to values shown in Table 6: the angle θ (refer to FIG. 2(b)) forming by the spraying direction of the nozzle apparatus 10 and the travel direction of the canvas K was set to values shown in Table 6; and an anti-soiling agent (Clean keeper PBS2020, 10% concentration, 2 cps viscosity (25° C.)) was sprayed at 4 cc/min. Note that the sliding type high pressure water cleaner was disposed at the position Q1 upstream from the nozzle apparatus 10. The water pressure of the sliding type high pressure water cleaner was 290 kg/cm$^2$.

[Evaluation Method]

Comparative evaluations were performed on Examples 54 to 98 in such a manner that soils on the surfaces of the canvas K and the outside roll OR (380 mm in diameter) were photographed at fixed points after a lapse of 10 days, and the percentage of pitch was calculated by means of image analysis.

Furthermore, the percentage of nozzle clogging caused by the adhesion of a solidified substance originated in the anti-soiling agent to the nozzle tip after the lapse of 10 days was examined by means of photography and image analysis.

Table 6 shows the results thus obtained.

TABLE 6

|  | Distance L (mm) | Angle θ | Soiling percentage of canvas | Soiling percentage of outside roll | Nozzle clogging percentage |
| --- | --- | --- | --- | --- | --- |
| Example 54 | 80 | 10 | 7% | 0% | 5% |
| Example 55 | 80 | 30 | 7% | 0% | 6% |
| Example 56 | 80 | 45 | 11% | 0% | 15% |
| Example 57 | 80 | 60 | 13% | 1% | 26% |
| Example 58 | 80 | 80 | 16% | 2% | 34% |
| Example 59 | 200 | 10 | 0% | 0% | 0% |
| Example 60 | 200 | 30 | 0% | 0% | 0% |
| Example 61 | 200 | 45 | 0% | 1% | 2% |
| Example 62 | 200 | 60 | 0% | 1% | 2% |
| Example 63 | 200 | 80 | 0% | 2% | 5% |
| Example 64 | 300 | 10 | 0% | 0% | 0% |
| Example 65 | 300 | 30 | 0% | 0% | 0% |
| Example 66 | 300 | 45 | 0% | 1% | 2% |
| Example 67 | 300 | 60 | 0% | 1% | 2% |
| Example 68 | 300 | 80 | 0% | 2% | 5% |
| Example 69 | 400 | 10 | 1% | 0% | 0% |
| Example 70 | 400 | 30 | 0% | 0% | 0% |
| Example 71 | 400 | 45 | 0% | 0% | 2% |
| Example 72 | 400 | 60 | 0% | 0% | 2% |
| Example 73 | 400 | 80 | 0% | 1% | 5% |
| Example 74 | 500 | 10 | 1% | 0% | 0% |
| Example 75 | 500 | 30 | 0% | 0% | 0% |
| Example 76 | 500 | 45 | 0% | 0% | 2% |
| Example 77 | 500 | 60 | 0% | 0% | 2% |
| Example 78 | 500 | 80 | 0% | 1% | 5% |
| Example 79 | 1000 | 10 | 1% | 0% | 0% |
| Example 80 | 1000 | 30 | 0% | 0% | 0% |
| Example 81 | 1000 | 45 | 0% | 0% | 2% |
| Example 82 | 1000 | 60 | 0% | 0% | 2% |
| Example 83 | 1000 | 80 | 0% | 1% | 5% |
| Example 84 | 1500 | 10 | 4% | %1 | 0% |
| Example 85 | 1500 | 30 | 2% | 1% | 0% |
| Example 86 | 1500 | 45 | 1% | 2% | 2% |
| Example 87 | 1500 | 60 | 1% | 2% | 2% |
| Example 88 | 1500 | 80 | 0% | 4% | 5% |
| Example 89 | 3000 | 10 | 8% | 3% | 0% |
| Example 90 | 3000 | 30 | 4% | 2% | 0% |
| Example 91 | 3000 | 45 | 2% | 4% | 2% |
| Example 92 | 3000 | 60 | 2% | 4% | 2% |
| Example 93 | 3000 | 80 | 0% | 8% | 5% |
| Example 94 | 5000 | 10 | 15% | 10% | 0% |
| Example 95 | 5000 | 30 | 7% | 8% | 0% |
| Example 96 | 5000 | 45 | 5% | 10% | 2% |
| Example 97 | 5000 | 60 | 5% | 10% | 2% |
| Example 98 | 5000 | 80 | 3% | 20% | 5% |

The results shown in Table 6 revealed that, in the case where the distance L was 80≤L<400, when the angle θ was set to 10≤θ≤30, or in the case where the distance L was 400≤L≤5000, when the angle θ was set to 30≤θ≤60, the canvas was considerably less soiled and the clogging percentage of the nozzle was considerably lower.

Examples 99 to 108

The paper machine illustrated in FIG. 5 was operated in such a manner that a wet paper having a paper width of 4.8 m was moved at a paper-making rate of 700 m/min; the nozzle apparatus 10 was disposed at the spraying position P4 illustrated in FIG. 5 for the canvas K and the distance L (refer to FIG. 2(b)) between the point of contact of the canvas K with a perpendicular from the nozzle tip of the nozzle apparatus 10 to the canvas K and the point of contact of the outside roll OR with the canvas K was set to 400 mm. Furthermore, the angle θ forming by the spraying direction of the nozzle apparatus 10 and the travel direction of the canvas K was set to 45°, and, under the conditions shown in Table 7, a silicone emulsion product (X-52-8247B (manufactured by Shin-Etsu Chemical Co., Ltd.), 50% concentration, 730 cps viscosity (25° C.)) was sprayed so that the sprayed portion had a width of 150 mm and H/W=1.

[Evaluation Method]

Comparative evaluations were performed on Examples 99 to 108 in such a manner that a paper machine was continuously operated for 5 days, then soils accumulated on the surface of the canvas K were photographed at a fixed point, and the percentage of soils (pitch) in 10 cm² of the canvas was calculated by means of image analysis.

Furthermore, the clogging percentage of the nozzle after the lapse of 5 days was calculated by means of photography and image analysis. Table 7 shows the results thus obtained.

TABLE 7

|  | Viscosity (cps) at room temperature (25 C. °) | Dilution magnification (twice) | Residual component (wt %) | Sprayed amount (cc/min) | Nozzle clogging percentage (%) | Soiling percentage of canvas (%) |
| --- | --- | --- | --- | --- | --- | --- |
| Example 99 | 730 | 1.00 | 50.0 | 1.00 | 70 | 55 |
| Example 100 | 700 | 1.01 | 49.5 | 1.01 | 65 | 43 |
| Example 102 | 600 | 1.03 | 48.5 | 1.03 | 60 | 5 |
| Example 103 | 500 | 1.06 | 47.2 | 1.06 | 20 | 3 |
| Example 104 | 300 | 1.16 | 43.1 | 1.16 | 15 | 2 |
| Example 105 | 200 | 1.24 | 40.3 | 1.24 | 5 | 0 |
| Example 106 | 100 | 1.43 | 35.0 | 1.43 | 5 | 0 |
| Example 107 | 50 | 1.69 | 29.6 | 1.69 | 5 | 0 |
| Example 108 | 3 | 6.00 | 8.3 | 6.00 | 0 | 0 |

The results shown in Table 7 revealed that, when the viscosity of the chemical solution was not more than 500 cps at room temperature (25° C.), the percentage of nozzle clogging caused by the scattered chemical was considerably lower, and the canvas K was considerably less soiled.

INDUSTRIAL APPLICABILITY

The method of spraying a chemical solution according to the present invention was suitably used as a spraying method employed for continuously spraying a chemical solution on a canvas K in a dry part of a paper machine. According to the present invention, a chemical solution can be efficiently applied to a traveling canvas, and the adhesion of paper powder and pitch to the canvas can be sufficiently prevented.

REFERENCE SIGNS LIST

1 . . . nozzle,
10 . . . spraying apparatus,
20 . . . soil removal apparatus,
A . . . overall width of canvas,
B . . . overall length of canvas,
D . . . dry part,
DK . . . doctor,
D1, D2, D3, D4, D5, D6, D7, D8, D9, D10, D11, D12 . . . dryer roll.
H . . . moving distance,
IR . . . inside roll,
K . . . canvas,
L . . . distance,
OR . . . outside roll,
R . . . diameter,
W . . . width of sprayed portion,
X . . . wet paper,
Y . . . chemical solution.
Y1 . . . spraying direction,
Y2 . . . travel direction,
Y3 . . . direction perpendicular to travel direction, and
Z . . . associated flow.

The invention claimed is:

1. A method of spraying a chemical solution, the method comprising spraying a chemical solution continuously on a canvas used in a dry part of a paper machine by a spraying apparatus while making the canvas travel,
   wherein the canvas is guided to an inside roll and an outside roll, and
   wherein the spraying apparatus is disposed upstream from the outside roll and between the inside roll and the outside roll, and the chemical solution is sprayed toward the outside roll along a travel direction of the canvas,
   wherein in a case where a distance L (mm) between a point of contact of the canvas with a perpendicular from a nozzle tip of the spraying apparatus to the canvas and a point of contact of the outside roll with the canvas is 80≤L<400, an angle θ formed by a spraying direction of the spraying apparatus and the travel direction of the canvas is 10≤θ≤30 degrees, and
   wherein in a case where the distance L (mm) is 400≤L≤5000, the angle θ formed by the spraying direction of the spraying apparatus and the travel direction of the canvas is 30≤θ≤60 degrees,
   wherein the spraying apparatus is a scanning type nozzle apparatus that sprays a chemical solution on the canvas while reciprocating in a direction perpendicular to the travel direction of the canvas,
   wherein a moving distance H of the nozzle apparatus during one rotation of the canvas and a width W of a portion sprayed on the canvas by the nozzle apparatus satisfy the following relationship:

$$0.5 \leq H/W \leq 12$$

wherein the moving distance H of the nozzle apparatus is from 15 mm to 1800 mm,
   wherein the width W of the sprayed portion by the nozzle apparatus is from 30 to 150 mm,
   an overall width of the canvas in a direction perpendicular to the travel direction of the canvas is in a range of 3000 mm to 9000 mm,
   an overall length of the canvas in the travel direction of the canvas is in a range of 25000 mm to 90000 mm, and
   wherein a time required for one rotation of the canvas is in a range of 1 second to 20 seconds.

2. The method of spraying a chemical solution according to claim 1, wherein a soil removal apparatus that removes paper powder and pitch having adhered to the canvas is disposed upstream from the spraying apparatus for the canvas, and
   the soil removal apparatus is a sliding type high pressure water cleaner, and
   a hydraulic pressure of high-pressure water that is sprayed by the sliding type high pressure water cleaner is in a range of 80 kg/cm$^2$ to 600 kg/cm$^2$.

3. The method of spraying a chemical solution according to claim 1, wherein the chemical solution has a viscosity of not more than 500 cps at 25° C.,
   wherein an amount of the chemical solution sprayed is in a range of 0.1 µg/m$^2$ to 400 µg/m$^2$ in terms of solid contents, and
   a proportion of a residual component contained in the chemical solution is not more than 50% by mass.

* * * * *